United States Patent [19]
Dudko et al.

[11] 3,885,121
[45] May 20, 1975

[54] METHOD FOR ELECTROSLAG WELDING OF COPPER BLANKS

[76] Inventors: Daniil Andreevich Dudko, per. Mechnikova, 3, kv. 7, Kiev; Alexei Pavlovich Alexeenko, Brovarskogo raiona, ul. Chapaeva, 50, Vigurovschina Kievskoi oblasti; Ivan Ivanovich Lychko, ul. Sapernoe pole, 28, kv. 11, Kiev; Valentin Mikhailovich Iljushenko, ul. Vladimirskaya, 98/3, kv. 38, Kiev; Igor Ivanovich Suschuk-Sljusarenko, ul. Vyborskaya, 80/17, kv. 94, Kiev; Alexandr Grigorievich Tarnovsky, Teplichny per., 5, kv. 14, Moscow; Dmitry Nikolaevich Kostevich, kvartal 2, dom 20a, kv. 1, Shelekhov Irkutskoi oblasti; Jury Iosifovich Andrusenko, ul. Kurchatova, 13, kv. 66; Samuil Markovich Gurevich, bulvar Lesi Ukrainki, 2, kv. 2, both of Kiev; Gennady Nikolaevich Strakhov, ul. Petrozavodskaya, 32, korpus 2, kv. 216, Moscow, all of U.S.S.R.

[22] Filed: Mar. 4, 1974

[21] Appl. No.: 448,051

Related U.S. Application Data

[63] Continuation of Ser. No. 260,730, June 8, 1972, abandoned.

[52] U.S. Cl. .......... 219/73; 13/9; 164/52; 219/126; 219/137 R; 219/146
[51] Int. Cl. .............................. B23k 25/00
[58] Field of Search ....... 13/9; 164/52, 252; 219/73, 219/126, 137, 146

[56] References Cited
UNITED STATES PATENTS

| | | | |
|---|---|---|---|
| 3,193,660 | 7/1965 | Colinet | 219/126 |
| 3,200,232 | 8/1965 | Danhier | 219/126 X |
| 3,296,412 | 1/1967 | Waite et al. | 219/126 |
| 3,571,475 | 3/1971 | Holzgruber et al. | 13/9 |
| 3,585,343 | 6/1971 | Crichton | 219/126 X |
| 3,610,867 | 10/1971 | Bartle | 219/126 X |
| 3,666,908 | 5/1972 | Crichton | 219/126 X |
| 3,710,068 | 1/1973 | Calton et al. | 219/126 X |
| 3,791,860 | 2/1974 | Zelley et al. | 219/146 X |

*Primary Examiner*—J. V. Truhe
*Assistant Examiner*—N. D. Herkamp

[57] ABSTRACT

A method for electroslag welding of copper blanks about 100×200 mm. in cross-section accomplished in a device produced from heat-insulating material retaining the heat of a slag bath and possessing a deoxidizing capacity for weld metal, by using first a nonconsumable and then a consumable electrode. As a metal bath emerges into a gap between the blank surfaces being welded, the weld is cooled below its crystallization front.

4 Claims, No Drawings

METHOD FOR ELECTROSLAG WELDING OF COPPER BLANKS

This application is a continuation of Ser. No. 260,730 file June 8, 1972, now abandoned.

The present invention relates to procedures for the electroslag welding of metals and more particularly to methods for the electroslag welding of copper blanks featuring substantial cross-sectional area being welded with measures approx. 150×200 mm.

Electroslag welding procedures for metal blanks, preferably steel, ensuring the production of sound and strong welds are widely known.

Previous attempts to weld copper blanks by welding procedures developed for steel blanks failed.

Copper possesses high thermal conductivity and great affinity for oxygen, so that high-melting fluxes employed in the electroslag welding of steels are therefore inapplicable to welding copper. Moreover no conditions prerequisite for producing strong joints between weld metal and the blank surfaces being welded could be attained heretofore owing to inadequate heating up of the above surfaces at the initial stage of the process. A copper electrode melts off quickly, the speed of traverse of a metal pool exceeding that of fusion of the surfaces being welded.

Because of these difficulties copper blanks are still welded by such methods as: gas, electric arc, gas-arc welding, etc.

Gas welding of copper is usually accomplished with an acetylene-oxygen flame, the welding operation being performed in a single pass since rewelding necessarily leads to the origination of pores and cracks in the weld produced hereinbefore.

Electric-arc welding of copper blanks with coated consumable electrodes has found sufficiently wide application. The copper blanks up to 4 mm thick are welded without preheating. However welding copper blanks ranging in thickness from 10 to 12 mm. requires additional preheating to a temperature of from 200°C to 750°C.

The gas-arc welding of copper blanks may be carried out with either non-consumable or fusible electrodes. Copper blanks in thicknesses up to 4 mm. are commonly welded in the cold state (without preheating) with a non-consumable tungsten electrode by using a shield of argon while for thicknesses of up to 8 mm. - helium or nitrogen is employed. The fusible (consumable) electrode is suitable for welding up to 6-mm. blanks in argon and up to 10-mm. in helium or nitrogen in the cold state (without preheating).

Submerged arc welding with either non-consumable carbon or fusible (consumable) metal electrodes is known in the prior art. In submerged arc single-pass welding welded airtight joints may be obtained on thicknesses up to 40–60 mm. without preheating the edges being welded.

Also known is a plasma-arc procedure for copper blanks, for instance, chrome bronze, the process being however applicable only to sheet billets up to 60 mm. thick.

When copper blanks upwards of 60 mm. are welded by the above processes strong welded joints could not be obtained heretofore.

An electroslag welding procedure has been proposed for joining low-melting heat-conducting metals and alloys, comprising the preestablishment and overheating of a slag bath with a non-consumable electrode (Author's Certificate of the USSR No. 186586 filed in 1966).

However this prior-art process did not find use in practice because of the lack of fluxes for welding copper by the elctroslag procedure and owing to heat losses, the heat being in this case not retained in a receptacle referred to hereinafter as a "pocket" of a welding device, whereas it (the heat) is needed for melting the surfaces (edges) being welded of the copper blanks featuring high thermal conductivity.

Besides, the known procedure practically does not allow obtaining the requisite heat input (an amount of heat given up primarily by overheated droplets of a filler) ensuring the formation of a welded joint during the entire welding process.

In recent years a need has arisen for welding copper blanks of a large cross-sectional area measuring 150×200 mm. For that purpose it was necessary to solve a range of problems pertaining to the development of a flux and a procedure for the electroslag welding of the copper blanks, its techniques being such as to provide for its practical implementation.

Accordingly a flux has been proposed for the electroslag welding of metals, preferably copper and its alloys, containing in per cent by weight: sodium fluoride 50–67, lithium fluoride 18–20, calcium fluoride 7–14, silicon dioxide 6–10 and marble up to 8 (Author's Certificate of the USSR No. 272027 filed in 1968).

Fluidity of the flux of the above composition ensures intense heat transfer to the blank surfaces being welded.

The basic object of the present invention is to develop a method for the electroslag welding of heavy-gauge copper blanks with a cross-sectional area in a welding zone of about 150×200 mm.

Another important object of this invention is to provide a welded joint almost equal in strength to the base metal being welded.

Still another object of the invention is to provide a weld with a finely-particulated structure.

Yet another no less important object of the present invention is to reduce the contents of harmful admixtures in the weld metal to favorably effect its strength.

These and other objects are achieved by developing a method for electroslag welding of copper blanks accomplished in a device comprising a pocket to retain a slag bath and back-up plates (shoes) to mold a weld through the use of electrodes and low-melting fluoride fluxes, in which method according to the invention said process is carried out in a device produced from heat-insulating material retaining the heat of the slag bath and possessing a deoxidizing capacity for the weld metal, the slag bath being at first heated by a non-consumable electrode in the heat-insulated pocket of the device until the blank edges being welded start melting whereafter a consumable laminated electrode is employed and as the metal bath emerges into the gap between the blank surfaces being welded the weld is cooled down below its crystallization front.

The above method ensures the production of strong welded joints in the copper blanks measuring 150×200 mm in cross-section.

The said device is preferably made from graphite.

This would provide for accumulation of the heat of the slag bath and concurrent deoxidation of the weld metal.

In carrying out the foregoing method it would be expedient to employ a laminated consumable electrode containing a deoxidizing agent selected from high-melting metals, such as titanium.

This would enable a more intense deoxidation of the weld metal and the production of an airtight joint, featuring high strength properties.

Use may be made of a consumable electrode with at least a single built-in titanium wire.

The wires, being superior to copper in infusibility, will melt with a certain time lag and their contact with the surface of the metal pool will lead to short-circuiting causing detonations. The latter will promote the formation a finely-particulated structure of the weld.

A fuller understanding of the present invention will be had from the following description of an exemplary embodiment.

For the electroslag welding of copper blanks, as for welding steel blanks, a device is produced to retain a slag bath and to mold a weld. Placed on a copper plate connected to a current lead are a pocket base plate and two blocks. They are set up with a mandatory assembly clearance which is specified according to the nature of deformation during welding and with due account to the experience gained in welding similar structures or special full-scale specimens. The blocks correspond in width to the blanks being welded. Next the blanks are mounted on the pocket blocks and atop are set up the blocks for displacing a slag bath and a shrinkage cavity beyond the limits of the blanks being welded. The cavity formed thereof (a welding gap) is covered on the sides by back-up plates (shoes) which serve to mold the weld and which are tightly fastened with the aid of conventional screw clamping appliances. Insofar as copper has high thermal conductivity, the members, from which the pocket is produced, are made from a material with a lower thermal conductivity than copper, e.g. graphite. Owing to this an adequate amount of thermal power can be accumulated at the initial stage of the process, which is prerequisite for melting the blank edges being welded and for the complete fusing together of the weld and parent metal.

The copper blanks are electroslag welded without using a protective atmosphere. However in view of the fact that copper is highly susceptible to oxidation, a more intense deoxidation of copper is ensured by using the device to retain a slag bath and to mold a weld produced from a more active oxygen absorbent than copper, for example, from graphite.

For establishing a slag bath a flux is employed containing in per cent by weight: sodium fluoride 50–67, lithium fluoride 18–20, calcium fluoride 7–14, silicon dioxide 6–10, and marble up to 8.

Other flux compositions may also be employed, the fluxes containing fluoride compounds of alkali and alkaline earth metals.

Such fluxes have low viscosity, enhanced fluidity and electrical conductivity ensuring intense convective heat transfer to the blank surfaces being welded.

The above fluxes in a hot fluid state are poured into the pocket of the device whereafter voltage is applied across a non-consumable electrode immersed into the slag bath. The latter is heated by the non-consumable electrode until the blank edges being welded start melting.

Then a consumable electrode is substituted for the non-consumable one.

A consumable laminated electrode with longitudinal grooves or an electrode built-up of separate elements may also be used.

Included in the composition of the electrode metal may be a deoxidizer selected from high-melting metals, such as titanium, niobium and zirconium. This would additionally intensify deoxidation of a welded joint enabling the production of an airtight weld featuring high strength characteristics.

It is possible to employ a consumable electrode with one or more built-in titanium wires. When the wires come into contact with the surface of the metal bath, this results in short-circuiting which is conducive to the production of a finely-particulated weld metal structure. As the molten pool emerges into the joint gap, the weld is cooled down below its crystallization front by feeding a stream of coolant.

Upon testing weld seams performed in copper blanks measuring 150×200 mm. by the electroslag technique the following results were obtained: a) base metal: tensile strength 18.5–19.1 kg/mm$^2$, yield point 9.2–9.8 kg/mm$^2$, elongation 46.5–47.1 percent, reduction in area 82.9–83.1 percent (at 20°C); b) weld metal: tensile strength 17.1–17.9 kg/mm$^2$, yield point 8.2–8.9 kg/mm$^2$, elongation 42.3–45.4 percent, reduction in area 81.9–82.1 percent (at a 20°C temperature).

What is claimed is:

1. A method for electroslag welding of copper blanks employing a slag bath contained in a pocket formed by a base plate, supporting blocks under the copper blanks, the copper blank surfaces to be welded, covering blocks resting on top of the copper blanks and back-up plates covering the sides of the gap between the copper blanks, said method comprising the steps of pouring a molten flux comprising alkali metal and alkaline earth metal fluorides into said pocket to form a slag bath, immersing a non-consumable electrode into said slag bath, applying voltage across said non-consumable electrode to heat the slag bath until the blank edges being welded start melting, replacing the nonconsumable electrode by a consumable, laminated copper electrode to establish a molten metal bath, directing a stream of coolant on said molten metal bath as it emerges into the gap between the blank surfaces to be welded in order to cool the weld below its crystallization front, wherein said base plate, supporting blocks, covering blocks and back-up plates are formed of a heat-insulating material being a more active oxygen absorbent than copper and having a thermal conductivity lower than copper, so that the heat of the slag bath is retained and complete fusing of the weld metal and copper blank metal occurs.

2. The method of claim 1 wherein said heat-insulating material is graphite.

3. The method of claim 2 wherein said flux comprises in percent by weight: 50–67 sodium fluoride, 18–20 lithium fluoride, 7–14 calcium fluoride, 6–10 silicon dioxide and 0–8 marble.

4. The method of claim 1 wherein said consumable electrode further comprises a built-in single titanium wire.

* * * * *